(12) United States Patent
Ho et al.

(10) Patent No.: US 11,267,993 B2
(45) Date of Patent: Mar. 8, 2022

(54) POLYURETHANE SURFACING FILM

(71) Applicant: 3M INNOVATIVE PROPERTIES COMPANY, St. Paul, MN (US)

(72) Inventors: Charlie C. Ho, Woodbury, MN (US); Yongshang Lu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/276,354

(22) PCT Filed: Dec. 20, 2019

(86) PCT No.: PCT/IB2019/061223
§ 371 (c)(1),
(2) Date: Mar. 15, 2021

(87) PCT Pub. No.: WO2020/129024
PCT Pub. Date: Jun. 25, 2020

(65) Prior Publication Data
US 2022/0041897 A1    Feb. 10, 2022

Related U.S. Application Data

(60) Provisional application No. 62/783,058, filed on Dec. 20, 2018.

(51) Int. Cl.
*C08G 18/24* (2006.01)
*C09J 7/29* (2018.01)
(Continued)

(52) U.S. Cl.
CPC .............. *C09J 7/29* (2018.01); *B05D 7/574* (2013.01); *C09J 7/38* (2018.01); *C08G 18/3206* (2013.01);
(Continued)

(58) Field of Classification Search
CPC .............. B32B 7/12; B05D 7/574; C09J 7/29
See application file for complete search history.

(56) References Cited

U.S. PATENT DOCUMENTS

RE24,906 E    12/1960  Ulrich
3,331,729 A    7/1967  Danielson
(Continued)

FOREIGN PATENT DOCUMENTS

WO    WO 1987-000189         1/1987
WO    WO-2020129024 A1 *    6/2020    ......... C08G 18/6225

OTHER PUBLICATIONS

International Search Report for PCT International Application No. PCT/IB2019/061223, dated Mar. 25, 2020, 4 pages.

*Primary Examiner* — Michael M Dollinger
(74) *Attorney, Agent, or Firm* — Philip P. Soo (57) ABSTRACT

Surfacing films and related processes are provided. These films include a first clear coat layer comprising a first crosslinked polyurethane that is the reaction product of an isocyanate; a polyol selected from the group consisting of: a caprolactone polyol, polycarbonate polyol, a polyester polyol, acrylic polyol, polyether polyol, polyolefin polyol, and mixtures thereof; and a hydroxy-functional silicone poly(meth)acrylate; a second clear coat layer comprising a crosslinked polymer that is essentially free of hydroxy-functional silicone poly(meth)acrylate; a bulk layer comprising a thermoplastic polyurethane; and an adhesive layer. The provided films overcome the problem of migration of solvents and other impurities into the polyurethane bulk layer because the clear coat layer is cured, and solvents removed, prior to the coating of the polyurethane bulk layer. Manufacturing of these films can provide substantially faster line speeds and reduced waste.

15 Claims, 2 Drawing Sheets

(51) Int. Cl.
  *C09J 7/38*   (2018.01)
  *B05D 7/00*  (2006.01)
  C08G 18/32  (2006.01)
  C08G 18/73  (2006.01)
  C08G 18/42  (2006.01)
  C09D 175/04  (2006.01)

(52) U.S. Cl.
  CPC ............. *C08G 18/42* (2013.01); *C08G 18/73* (2013.01); *C09D 175/04* (2013.01); *C09J 2301/302* (2020.08); *C09J 2301/414* (2020.08); *C09J 2453/006* (2013.01); *C09J 2475/006* (2013.01)

(56) References Cited

U.S. PATENT DOCUMENTS

| | | | |
|---|---|---|---|
| 4,418,120 A | 11/1983 | Kealy | |
| 4,619,867 A | 10/1986 | Charbonneau | |
| 4,835,217 A | 5/1989 | Jorgensen | |
| 5,268,215 A | 12/1993 | Krenceski | |
| 6,180,175 B1 | 1/2001 | Saika | |
| 6,607,831 B2 | 8/2003 | Ho | |
| 8,765,263 B2 * | 7/2014 | Ho | B32B 27/08 |
| | | | 428/423.3 |
| 2013/0059120 A1 * | 3/2013 | Shi | C08J 7/046 |
| | | | 428/147 |
| 2017/0107398 A1 | 4/2017 | Ho | |
| 2018/0094164 A1 * | 4/2018 | Ito | B32B 27/32 |

* cited by examiner

POLYURETHANE SURFACING FILM

CROSS REFERENCE TO RELATED APPLICATIONS

This application is a national stage filing under 35 U.S.C. 371 of PCT/IB2019/061223, filed Dec. 20, 2019, which claims the benefit of U.S. Provisional Patent Application No. 62/783,058, filed Dec. 20, 2018, the disclosures of which are incorporated by reference in their entirety herein.

FIELD OF THE INVENTION

Provided are surfacing films for paint protection or paint replacement applications. The provided films can be useful, for example, in paint protection or paint replacement applications for automotive and aerospace exteriors.

BACKGROUND

Surfacing films are applied to exterior surfaces and protect underlying substrates from damage caused by environmental weathering, chemical exposure, heat, and/or abrasion. These films can be used to protect either painted or unpainted surfaces. When applied to a painted surface, they are commonly referred to as paint protection films. When applied to unpainted surfaces, they can be used to provide color, in which case they may be referred to as body color film or paint replacement film.

Films made from polyurethane can withstand harsh environments, making them suitable for these applications. Polyurethanes are synthetic polymers of great commercial and industrial importance. They are commonly prepared by reacting a multifunctional isocyanate with a multifunctional diol or polyol in the presence of a catalyst to produce polymers containing carbamate (—NH—CO—O—) linkages. Thermoplastic polyurethanes are characterized by linear polymeric chains having self-ordering block structures, while thermoset polyurethanes are highly crosslinked by covalent bonds.

Depending on the components used to make the polyurethane, these materials can be engineered to display a high degree of chemical resistance and a wide range of material properties. Polyurethanes can also be extremely durable and flexible, making them desirable materials for many applications. Other useful commercial and industrial applications include high-resilience foam seating, rigid foam insulation panels, microcellular foam seals and gaskets, hoses, elastomeric wheels and tires, automotive suspension bushings, electrical potting compounds, high performance adhesives, coatings and sealants, synthetic fibers, and carpet underlayment.

SUMMARY

Known surfacing films display varying degrees of scratch resistance, self-healing properties, and stain resistance, but significant opportunities for improvement remain in other areas. For example, there is a continued potential to improve both initial and aged adhesive peel strength. Further, these products can have a strong odor as a result of residual solvent and/or other volatile compounds in the adhesive, which provides an undesirable user experience. Current manufacturing methods also tend to have a low throughput yield, which drives up unit costs for the film.

Many of these issues can be attributable to the coating of a solvent-based reactive polyurethane clear coat layer directly onto the surface of a urethane bulk layer in the manufacturing process. These coatings are generally thermally cured, typically at high temperatures. As a result, the urethane bulk layer tends to soften and solvents migrate into the adjacent urethane bulk layer and adhesive layer during the curing process. These solvents can also convey processing additives, such as wax and anti-sticking agents, from the bulk thermoplastic polyurethane into the adhesive layer. The solvents and processing additives are impurities that can degrade peel adhesion and produce a strong solvent odor in the adhesive.

In the provided processes and articles, a surfacing film using a dual-layer clear coat was used to mitigate or eliminate the issues above. The surfacing film was produced by coating a first layer of crosslink-able reactive polyurethane clear coat on a releasable polyester carrier web followed by coating a second layer of crosslinkable polyurethane clear coat over the first layer clear coat. A thermoplastic polyurethane was laminated to the surface of the second layer of crosslinkable polyurethane layer by an extrusion process or by a hot lamination process. The thermoplastic polyurethane side can then be laminated to a transfer adhesive.

In one aspect, a surfacing film is provided. The surfacing film comprises a plurality of layers, in the following order: a first clear coat layer comprising a crosslinked polyurethane that is a reaction product of: an isocyanate; a polyol selected from the group consisting of: a caprolactone polyol, polycarbonate polyol, a polyester polyol, acrylic polyol, polyether polyol, polyolefin polyol, and mixtures thereof; and a silicone poly(meth)acrylate; a second clear coat layer comprising a crosslinked polymer that is essentially free of silicone poly(meth)acrylate; a bulk layer comprising a thermoplastic polyurethane; and an adhesive layer.

In a second aspect, paint protection films and paint replacement films are provided comprising the surfacing films.

In a third aspect, a process of making a surfacing film is provided, comprising: disposing a first curable polyurethane clear coat composition on a first release liner, the first curable polyurethane clear coat composition comprising a hydroxy-functional silicone poly(meth)acrylate; only partially curing the first curable polyurethane clear coat composition to provide a first clear coat layer; disposing a second curable polyurethane clear coat composition onto the first clear coat layer; at least partially curing the second curable polyurethane clear coat composition to provide a second clear coat layer on the first clear coat layer, the second curable polyurethane clear coat composition essentially free of hydroxy-functional silicone poly(meth)acrylate; disposing a thermoplastic polyurethane layer onto the second clear coat layer; and disposing a pressure-sensitive adhesive onto the thermoplastic polyurethane layer.

The aforementioned articles and processes provide many technical advantages, at least some of which are unexpected. For one, use of a dual-layer clear coat layer avoids the problem of migration of solvents and other impurities into the polyurethane bulk layer because the clear coat layer is cured, and solvents removed, prior to the coating of the polyurethane bulk layer. Surprisingly, the water-borne second clear coat layer can strongly adhere to the first clear coat layer when the latter contains hydroxy-functional silicone poly(meth)acrylate end groups and has a high crosslink density. As shall be described in more detail herein, significant manufacturing improvements can also be realized as a result of substantially faster line speeds and reduced waste.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. Figures are not drawn to scale.

DEFINITIONS

As used herein:

"ambient conditions" means at a temperature of 25 degrees Celsius and a pressure of 1 atmosphere (approximately 100 kilopascals);

"ambient temperature" means at a temperature of 25 degrees Celsius;

"catalyst" means a substance that can increase the speed of a chemical reaction;

"diol" means a compound having a hydroxyl functionality of exactly two;

"diisocyanate" means a compound having an isocyanate functionality of exactly two;

"cure" means to alter the physical state and or chemical state of the composition to make it transform from a fluid to less fluid state, to go from a tacky to a non-tacky state, to go from a soluble to insoluble state, to decrease the amount of polymerizable material by its consumption in a chemical reaction, or go from a material with a specific molecular weight to a higher molecular weight;

"curable" means capable of being cured;

"essentially free of" means having only trace amounts of a given substance, for example having less than 0.5%, 0.4, 0.3, 0.2, 0.1, 0.05, 0.02, 0.01, 0.005, or 0.001% by weight of that substance;

"fully cured" means cured to a state where the composition is suitable for use in its intended application;

"partially cured" means cured to a state that is less than fully cured;

"polyisocyanate" means a compound having an isocyanate functionality of two or more;

"polyol" means a compound having a hydroxyl functionality of two or more; and

"primary isocyanate" means a carbon atom upon which the isocyanate group is attached also has two hydrogen atoms.

DETAILED DESCRIPTION

As used herein, the terms "preferred" and "preferably" refer to embodiments described herein that may afford certain benefits under certain circumstances. However, other embodiments may also be preferred, under the same or other circumstances. Furthermore, the recitation of one or more preferred embodiments does not imply that other embodiments are not useful, and other embodiments are not excluded from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way. Figures are not necessarily to scale.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Layer Constructions

Figure 1:
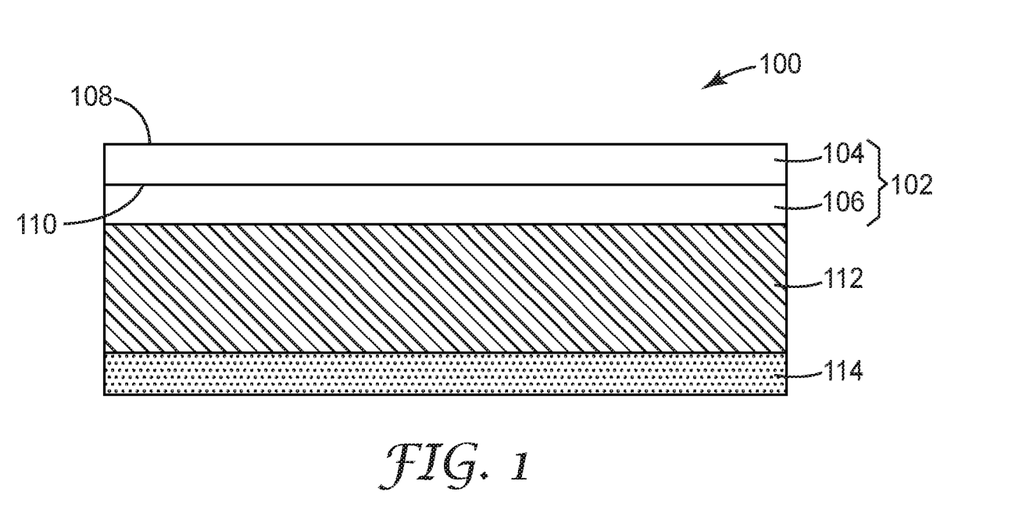
FIG. 1 is a side, cross-sectional view of a surfacing film according to one exemplary embodiment.

A multilayered surfacing film according to one embodiment is illustrated in FIG. 1 and herein designated by the numeral 100. As shown, the surfacing film 100 includes a composite clear coat layer 102 that includes a first clear coat layer 104 and a second clear coat layer 106.

As shown, the first clear coat layer 104 has a top surface 108 and bottom surface 110. The top surface 108 is optionally an exposed major surface of the surfacing film 100 as shown, but can optionally be covered by a protective liner or cover layer so as to avoid scratching the surfacing film 100 during storage and handling.

The first clear coat layer 104 is obtained by curing a polyurethane composition. In some embodiments, the polyurethane composition is a curable composition whose components react with each other to provide a cured, hardened layer. The curable composition used to obtain the first clear coat layer 104 can include a polyisocyanate, a polyol and a hydroxy-functional silicone poly(meth)acrylate.

Suitable polyisocyanates include diisocyanates and polyisocyanates with an isocyanate functionality of greater than 2. In exemplary embodiments, the polyisocyanate is a primary polyisocyanate, such as a primary aliphatic polyisocyanate. Primary polyisocyanates having an isocyanate functionality of 3 or more can be made from primary diisocyanates, such as 1,6-hexamethylene diisocyanate, trimethyl-hexamethylene diisocyanate, 1,4-tetramethylene diisoycanate, 1,3-xylene diisocyanate, 1,4-xylene diisocyanate, 1,12-dodecamethylene diisocyanate, 2-methylpentamethylene diisocyanate, or 1,4-cyclohexane dimethylene diisocyanate.

The polyisocyanate can represent from 30% to 90%, from 40% to 80%, from 50% to 70%, or in some embodiments, less than, equal to, or greater than, 30%, 35, 40, 45, 50, 55, 60, 65, 70, 75, 80, 85, or 90% by weight, relative to the overall weight of the uncured polyurethane composition.

Suitable polyols include diols and polyols with a hydroxyl functionality of greater than two. Polyols can be selected from the group consisting of: caprolactone polyols, polycarbonate polyols, polyester polyols, acrylic polyols, polyether polyol, polyolefin polyol, and mixtures thereof.

Collectively, the polyol components used in making the first clear coat layer 104, excluding hydroxy-functional silicone poly(meth)acrylate, can account for from 25% to 80%, from 30% to 70%, from 30% to 60%, or in some embodiments, less than, equal to, or greater than, 25%, 30, 35, 40, 45, 50, 55, 60, 65, 70, 75, or 80% by weight, relative to the overall weight of the uncured polyurethane composition.

The hydroxy-functional silicone poly(meth)acrylate is a copolymer comprised of siloxane side groups, such as polydimethylsiloxane side groups, covalently bonded to an acrylic or methacrylic backbone. The copolymer may have exactly one hydroxyl group, in which case it is a monohydroxyl silicone poly(meth)acrylate. Alternatively, the hydroxy-functional silicone poly(meth)acrylate can have more than one hydroxyl group, in which case it is a silicone poly(meth)acrylate polyol. The backbone of the hydroxy-functional silicone poly(meth)acrylate can contain any of a variety of repeat units, including for example hydroxyethyl methacrylate, 2-ethylhexyl acrylate, 2-ethylhexanol, styrene, and combinations thereof.

Addition of the hydroxy-functional silicone poly(meth)acrylate can substantially improve stain resistance of the first clear coat layer 104 when fully cured. The hydroxy-functional silicone poly(meth)acrylate can be from 0.1% to 4%, from 0.1% to 3%, from 0.1% to 2%, or in some embodiments, less than, equal to, or greater than 0.1%, 0.2, 0.3, 0.4, 0.5, 0.6, 0.7, 0.8, 0.9, 1, 1.25, 1.5, 1.75, 2, 2.5, 3, 3.5, or 4% by weight, based on the overall weight of the uncured polyurethane composition.

The curable composition can further include a catalyst to facilitate reaction between the polyisocyanate and polyol components. Useful catalysts in the polymerization of polyurethanes include aluminum-, bismuth-, tin-, vanadium-, zinc-, mercury-, and zirconium-based catalysts, amine catalysts, and mixtures thereof. Preferred catalysts include tin based catalysts, such as dibutyl tin compounds. Especially preferred are catalysts selected from the group consisting of dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide.

Suitable amounts of the catalyst can be from 0.001% to 0.2%, from 0.001% to 0.15%, from 0.001% to 0.1%, or in some embodiments, less than, equal to, or greater than 0.001%, 0.002, 0.005, 0.007, 0.01, 0.02, 0.05, 0.07, 0.1, 0.12, 0.15, 0.17, or 0.2% by weight, based on the overall weight of the uncured polyurethane composition.

If desired, other components can also be included in the first curable clear composition, such as ultraviolet light absorbers, hindered amines, leveling agents, colorants, flame retardants, and pot life extenders.

An organic solvent can be used to adjust the viscosities of the reactive mixture used to make the first clear coat layer 104. Such solvents can include ether acetate, propyleneglycol monomethylether acetate, ketone, benzene derivatives, and mixtures thereof. The amount of solvent can be selected to facilitate adequate mixing and casting of the curable polyurethane composition. The organic solvent used is generally volatile so that it can be removed prior to, or concurrently with, the curing of the first clear coat layer 102. Such evaporation could be facilitated by heat, vacuum, or both.

When the foregoing reactive components are mixed and sufficiently heated, they polymerize into a crosslinked network. The crosslink density of a polyurethane is calculated by dividing the weight of the reaction components having a functionality of 3 or greater by the total weight of the polyurethane and multiplying by 100. High crosslink densities, for example exceeding 30 percent, are generally associated with rigid polyurethane materials. Use of a primary aliphatic polyisocyanate, however, can enable polyurethanes that are both flexible and have a high crosslink density. Useful crosslink densities can be from 25% to 100%, from 30% to 100%, or in some embodiments, less than, equal to, or greater than 25%, 30, 35, 40, 45, 50, 55, 60, 65, 70, 75, 80, 85, 90, or 95, or less than or equal to 100%.

The ultimate thickness of the first clear coat layer 104 can vary as needed for the end application. Typically, the thickness of the first clear coat layer 104 is from 2 micrometers to 25 micrometers, from 2 micrometers to 20 micrometers, from 2 micrometers to 15 micrometers, or in some embodiments, less than, equal to, or greater than 2 micrometers, 3, 4, 5, 6, 7, 8, 9, 10, 12, 15, 17, 20, 22, or 25 micrometers.

The second clear coat layer 106 extends along and flatly contacts the bottom surface 110 of the first clear coat layer 104. The second clear coat layer 106 is made by curing a second polyurethane composition. Use of a second polyurethane composition can be advantageous; in some embodiments, secondary bonding (e.g., hydrogen bonding) occurs at the interface between the first and second polyurethane clear coat layers, resulting in increased interlayer adhesion.

The second polyurethane composition can have characteristics similar to that of the first polyurethane composition as described above, but differs from the first polyurethane composition in that it does not contain a hydroxy-functional silicone poly(meth)acrylate.

In some embodiments, the second polyurethane composition is a water-borne polyurethane dispersion. Preferred water-borne polyurethane dispersions include aliphatic polycarbonate polyurethane dispersions. The dispersion can use a solvent system that includes water and one or more co-solvents. Certain co-solvents, such as diethylene glycol monomethyl ether, can be helpful to improve coating quality by reducing volatility of the dispersion.

The polyurethane dispersion can include any of a number of suitable surfactants, such as anionic surfactants. Anionic surfactants include, for example, sulfates such as sodium dodecyl sulfate, ammonium dodecyl sulfate, and sodium lauryl ether sulfate, and sulfosuccinnates such as dioctyl sodium sulfosuccinate and disodium lauryl sulfosuccinate. In waterborne coatings, these surfactants can be used in combination with co-dispersants. Co-dispersants include amino alcohols. Amino alcohols, such as 2-amino-2-methyl-1-propanol, can assist in neutralizing acid-functional resins, making them suitable for use in water-borne coatings.

The second polyurethane composition can include any suitable crosslinker, such as a polyfunctional aziridine liquid crosslinker. The amount of crosslinker is not critical and can be selected to provide the desired degree of crosslinking. The amount of crosslinker can be from 0.5% to 5%, from 0.5% to 4%, from 0.5% to 3%, or in some embodiments, less than, equal to, or greater than 0.5%, 0.6, 0.7, 0.8, 0.9, 1, 1.1, 1.2, 1.5, 1.7, 2, 2.2, 2.5, 2.7, 3, 3.2, 3.5, 3.7, 4, 4.2, 4.5, 4.7, or 5% by weight relative to the overall weight of the second polyurethane composition.

While not critical, other additives such as UV light absorbers and stabilizers can also be included in either or both of the first and second polyurethane compositions. Stabilizers can include hindered amine light stabilizers that eliminate free radicals produced by photo-oxidation of the polymer. Advantageously, these additives can help minimize defects caused by cracking and gloss reduction in the clear coat layer.

In a preferred embodiment, the water-borne polyurethane dispersion is a polycarbonate polyurethane having a solids content of from 30-40 wt % and an overall solvent content of from 5-15 wt %.

The second clear coat layer 106 has a chemical composition capable of permanently adhering to the first clear coat layer 104. Obtaining a high degree of adhesion to the first clear coat layer 106 is surprising, considering that the polyurethane of this layer contains silicone end groups, which are known to degrade interlayer adhesion with respect to conventional adhesives. Preferably, the first and second clear coat layers 104, 106 do not delaminate from each other during the lifetime of the surfacing film 100, even under harsh environments. Advantageously, the provided surfacing film 100 uses a second clear coat layer 106 that can be strongly adhered to a previously made first clear coat layer 104 that is highly crosslinked and contains terminal silicone poly(meth)acrylate groups.

The thickness of the second clear coat layer 106 need not be particularly restricted. In some embodiments, this thickness can be similar to that of the first clear coat layer 104. Typically, the film thickness of the second clear coat layer 106 when cured is from 2 micrometers to 30 micrometers, from 2 micrometers to 25 micrometers, from 2 micrometers to 15 micrometers, or in some embodiments, less than, equal to, or greater than 2 micrometers, 3, 4, 5, 6, 7, 8, 9, 10, 12, 15, 17, 20, 22, 25, 27, or 30 micrometers.

Referring again to FIG. 1, the composite clear coat layer 102 is disposed on a bulk layer 112 that extends across and continuously contacts the bottom surface of the second clear coat layer 106.

In a preferred embodiment, the bulk layer 112 is comprised of a thermoplastic polyurethane. However, it is also possible for the bulk layer 112 to be made from a polyester and/or polyolefin such polypropylene, polyethylene and blends of polyethylene and polypropylene, ethylene modified copolymers such as ethylene-vinylacetate, ethylene-(meth)acrylic acid, ethylene-methacrylate or a blend thereof. Useful bulk layer compositions for surfacing films that protect exterior surfaces of an automobile include ionomers of olefin/vinyl carboxylate copolymers such as ethylene-acrylic acid and ethylene-methacrylic acid copolymers combined with various metal cations including cations of lithium, sodium, potassium, zinc, aluminum and calcium. Suitable commercial ionomer resins include materials available from E.I. DuPont de Nemours & Co. of Wilmington, Del. under the trade designation SURLYN.

In a preferred embodiment, the bulk layer 112 is an aliphatic thermoplastic polyurethane, which can provide excellent optical characteristics, high flexibility, good heat and UV resistance, and good chip resistance.

The thickness of the bulk layer 112 is not particularly restricted. Preferably sufficiently thin to allow the overall surfacing film 100 to stretch as needed to conform to a substrate having three-dimensional contours that are curved or irregularly shaped, and yet sufficiently thick to protect the substrate against scratches and impacts encountered in use. The thickness of the bulk layer 112 can be from 50 micrometers to 600 micrometers, from 50 micrometers to 500 micrometers, from 50 micrometers to 350 micrometers, or in some embodiments, less than, equal to, or greater than 50 micrometers, 60, 70, 80, 90, 100, 125, 150, 175, 200, 225, 250, 270, 300, 325, 350, 375, 400, 450, 500, 550 or 600 micrometers.

An adhesive layer 114 extends across and directly contacts the major surface of the bulk layer 112 facing away from the first and second clear coat layers 104, 106. The adhesive layer 114 can be a pressure sensitive adhesive and is normally tacky at ambient conditions. Suitable pressure sensitive adhesives can be based on polyacrylates, synthetic and natural rubbers, polybutadiene and copolymers or polyisoprenes and copolymers. Silicone based adhesives such as polydimethylsiloxane and polymethylphenylsiloxane may also be used.

Particularly preferred pressure sensitive adhesives include polyacrylate-based adhesives, which can display advantageous properties as high degrees of clarity, UV-stability and aging resistance. Polyacrylate adhesives that can be used in surfacing film applications are described, for example, in U.S. Pat. No. 4,418,120 (Kealy et al.); Pat. No. RE24,906 (Ulrich); U.S. Pat. No. 4,619,867 (Charbonneau et al.); U.S. Pat. No. 4,835,217 (Haskett et al.); and International Publication No. WO 87/00189 (Bonk et al.).

Preferably, the polyacrylate pressure sensitive adhesive comprises a crosslinkable copolymer of a C4-C12 alkyl acrylate and an acrylic acid. The adhesive can be used with or without a crosslinker. Useful crosslinking reactions include chemical crosslinking and ionic crosslinking. The chemical crosslinker could include polyaziridine and/or bis-amide and the ionic crosslinker may include metal ions of aluminum, zinc, zirconium, or a mixture thereof. A mixture of chemical crosslinker and ionic crosslinker can also be used. In some embodiments, the polyacrylate pressure sensitive adhesive includes a tackifier such as rosin ester. Adhesives useful in the invention may also contain additives such as ground glass, titanium dioxide, silica, glass beads, waxes, tackifiers, low molecular weight thermoplastics, oligomeric species, plasticizers, pigments, metallic flakes and metallic powders as long as they are provided in an amount that does not unduly degrade the quality of the adhesive bond to the surface.

As an alternative to pressure sensitive adhesives, the adhesive layer 114 may be a hot melt adhesive, which is not tacky at room temperature but becomes tacky upon heating. Such adhesives include acrylics, ethylene vinyl acetate, and polyurethane materials.

Generally, the adhesive layer 114 can have a thickness of from 15 micrometers to 60 micrometers, from 15 micrometers to 50 micrometers, from 15 micrometers to 45 micrometers, or in some embodiments, less than, equal to, or greater than 15 micrometers, 17, 20, 22, 25, 27, 30, 35, 40, 45, 50, 55, or 60 micrometers.

For certain applications, such as applying the surfacing film 200 to an automotive exterior, it may be desirable for the adhesive to be repositionable, at least initially, so that the sheet can be adjusted to fit at a desired place before a permanent bond is formed. Such repositionability may be achieved by providing, for example, a layer of minute glass bubbles on the adhesive surface as disclosed in U.S. Pat. No. 3,331,729 (Danielson et al.).

Processes of Manufacture

Significant technical advantages provided by the provided surfacing films and related processes derive from improvements in throughput, web handling, and quality control in manufacturing these films.

Figure 2:
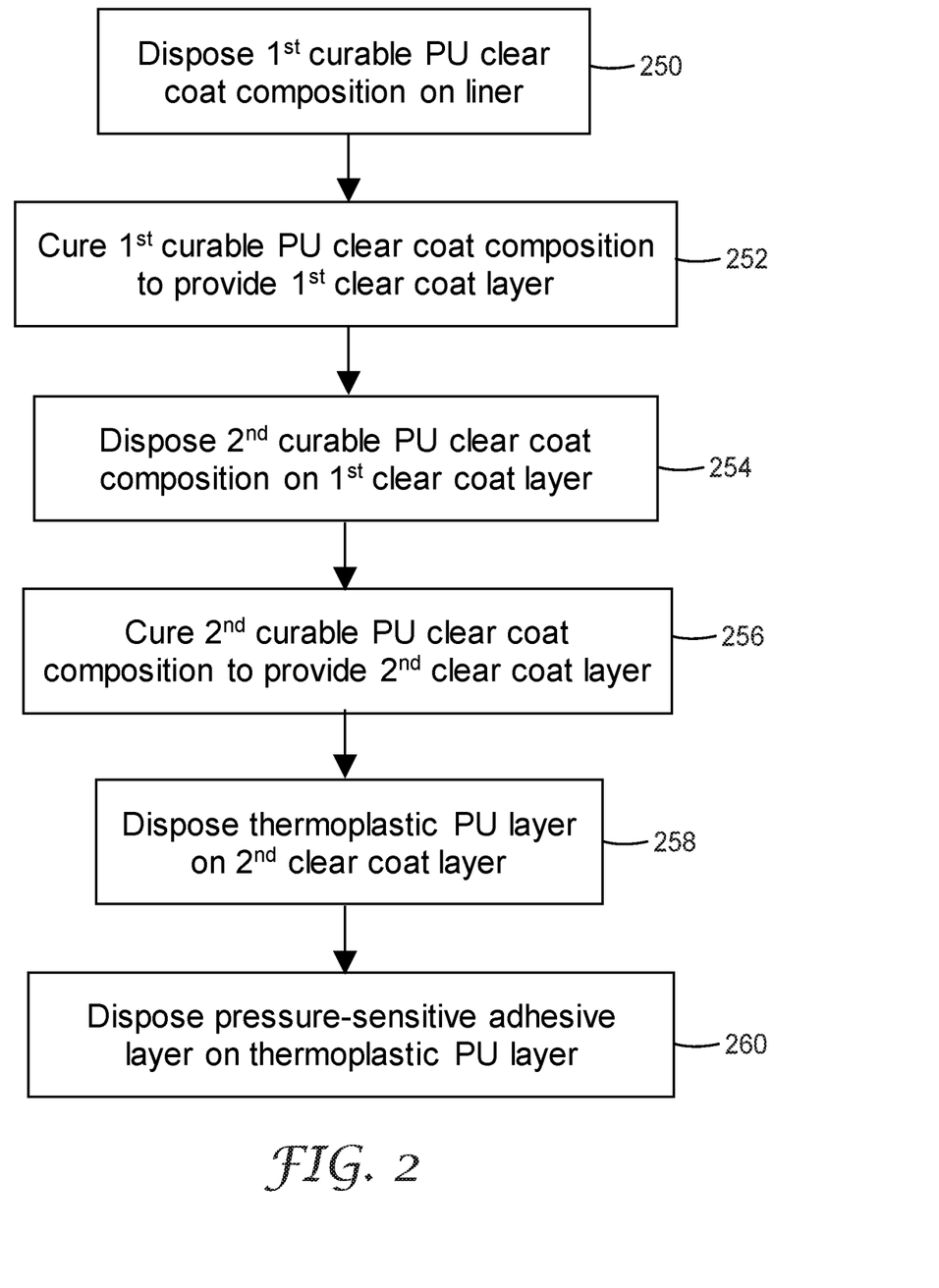
FIG. 2 is a block diagram showing an exemplary process for making the surfacing film of FIG. 1.

An exemplary process of making the provided surfacing films is provided in the block diagram of FIG. 2.

In block 250, a first curable polyurethane clear coat composition is disposed onto a release liner or other release surface. This clear coat composition is a liquid and can be coated using any known technique. Suitable techniques include, for example, coating or extruding onto the release liner. Coating and extruding of the disclosed curable clear coat compositions can take place using either batch or continuous techniques.

In an exemplary extrusion process, the components of the first curable polyurethane clear coat composition are initially mixed into two separate parts to prevent premature reaction. One part can be prepared by first mixing the polyol components with the hydroxy-functional silicone poly(meth)acrylate, a suitable solvent (if needed), and any optional additives. The other part contains the isocyanate component along with any solvent or optional additives. The first and second parts are then mixed in appropriate amounts to obtain a desired NCO:OH ratio. In these embodiments, the NCO:OH ratio can be selected to be between 0.75 and 1.25.

Once mixed, the composition can be coated onto a release surface, such as a polyester release liner. The coating can be made using conventional equipment such as a knife coater, roll coater, reverse roll coater, notched bar coater, curtain coater, rotogravure coater, or rotary printer. Coatings can be hand spread or automated and may be carried out according to either a batch or continuous process. The viscosity of the composition can be adjusted as needed to suit the type of coater used.

As provided in block 252, the first curable polyurethane clear coat composition is then cured. This can be achieved by subjected the clear coat composition to heat and/or vacuum to remove organic solvents and any other volatile components and thermally activate the curing reaction between the polyol and isocyanate and partially cure clear coat composition. In some embodiments, the first curable polyurethane clear coat composition is 45% to 55% cured, 40% to 60% cured, from 30% to 70% cured, or in some embodiments, less than, equal to, or greater than 30%, 35, 40, 45, 50, 55, 60, 65, or 70% cured.

The partial curing of the first curable clear coat composition was found to improve adhesion of the second clear coat layer to the first clear coat layer, particularly when the second curable polyurethane clear coat composition is disposed onto the partially-cured first curable clear coat composition and both layers cured together. By contrast, fully curing the first curable clear coat composition was observed to reduce adhesion of the first and second clear coat layers to each other.

An oven can be used to first evaporate the solvent and partially cure the composition. Commonly, the drying/curing step takes place in air. Where a continuous process is used, these processes can act upon a moving web. In an exemplary continuous process, a 0.0076 centimeter (0.003 inch) thick wet coating could have a solids content of about 45%, and be dried and cured using a temperature profile with a residence time of 2 minutes at 80° C. followed by a residence time of 10 minutes at 125° C.

In general, the clear coat composition is preferably dried and/or cured at pre-determined temperatures of from 25° C. to 150° C., or in some embodiments, less than, equal to, or greater than 25° C., 30, 35, 40, 45, 50, 55, 60, 65, 70, 75, 80, 85, 90, 95, 100, 105, 110, 115, 120, 125, 130, 135, 140, 145, or 150° C. Residence time at a given temperature, while highly dependent on the temperature, can be from 5 seconds to 180 seconds, 5 seconds to 150 seconds, 5 seconds to 120 seconds, or in some embodiments, less than, equal to, or greater than 5 seconds, 10, 15, 20, 25, 30, 35, 40, 45, 50, 60, 70, 80, 90, 100, 110, 120, 130, 140, 150, 160, 170, or 180 seconds. The clear coat composition is preferably subjected to residence times and temperatures, or temperature ranges, that balance solvent removal and curing effectiveness with overall throughput and energy efficiency.

In block 254, a second curable polyurethane clear coat composition is disposed on the partially-cured first clear coat layer, which at this time is still supported on a release liner. The second curable polyurethane clear coat composition can be a water-borne polyurethane dispersion or emulsion. Commercially available polyurethane dispersions and emulsions include, for example, those made by Alberdingk Boley, Inc., Greensboro, N.C.

Any known method can be used to dispose the second curable polyurethane clear coat composition on the underlying layer, including any of those mentioned above for coating the first curable polyurethane clear coat composition.

In block 256, the second curable polyurethane clear coat composition is cured to provide a second clear coat layer. Typically, heat is again applied to evaporate the water and/or any other volatiles species, and then cure the first and second clear coat layers. Oven temperature profiles can be similar to those disclosed above for partially curing the first curable polyurethane clear coat composition. Since the degree of cure need not be limited for this second curing cycle, however, it can be advantageous to use a higher temperature or increase the duration of the curing step if temperature is not significantly increased.

In some embodiments, the first and second clear coat layers are allowed to continue to cure having been cooled following the heating step and prior to any further coating or lamination steps. This can be accomplished by aging the composite clear coat layer at ambient conditions. Aging can take place for at least 1 week, at least 2 weeks, at least 3 weeks or at least 4 weeks to allow the first and second clear coat layers to reach a generally stable and consistent degree of crosslinking.

Block 258 shows the next step, in which the thermoplastic polyurethane bulk layer is disposed onto the exposed major surface of the second clear coat layer. Notably, by this time, both the first and second clear coat layers have been functionally cured. In some embodiments, the thermoplastic polyurethane layer can be melt processed and coated onto the composite clear coat layer from the melt. In alternative embodiments, the thermoplastic polyurethane layer can be melt processed and formed into a uniform film separately, then subsequently hot laminated to the composite clear coat layer.

As indicated in block 260, a pressure-sensitive adhesive layer of an above composition can then be disposed onto the thermoplastic polyurethane layer. Like the bulk layer, the adhesive layer can be directly coated onto the remaining layers of the surfacing film or formed into an adhesive film and then laminated to the bulk layer in a subsequent step. In the latter case, a sacrificial release liner is typically placed in contact with the adhesive layer to facilitate web handling and storage. In other embodiments, adhesives other than pressure-sensitive adhesives can be used in place of the pressure-sensitive adhesive layer in block 260.

Optionally, the steps of blocks 258 and 260 can be carried out in reverse order. For example, the pressure-sensitive adhesive and polyurethane bulk layer can be provided together on a release liner, and then the clear coat layers collectively laminated to the polyurethane bulk layer/adhesive/liner to obtain the finished surfacing film.

A significant advantage to disposing the bulk layer on the composite clear coat layer after the latter has been essentially fully cured is the reduction, or even elimination, of impurities in the polyurethane bulk layer and/or pressure-sensitive adhesive. This benefit results from driving out essentially all solvents and other volatile compounds from the composite clear coat layer before it is placed in contact with the remaining layers. By contrast, the conventional method disposes an uncured clear coat composition onto the bulk layer. As a result, solvent from the uncured clear coat composition can permeate into the bulk layer. This in turn can cause significant softening of the bulk layer, allowing impurities in the bulk layer, such as waxes and anti-sticking agents, to also migrate into the adjacent pressure-sensitive adhesive layer and degrade bond performance.

Unexpectedly, reducing/eliminating the migration of small molecules into the bulk layer also had the effect of providing a more stable stiffness in the surfacing film. Since the bulk layer is made from a thermoplastic polyurethane, it is prone to stiffening as a result of polyisocyanate crosslinker migrating along with solvents and other additives from the first clear coat layer, through the second clear coat layer and into the bulk layer. This can result in light crosslinking of the bulk layer over a period of 2 to 3 months. Since this occurs during storage, it results in the end product having inconsistent film stiffness, which is undesirable. This phenomenon can be observed by attempting to dissolve the thermoplastic bulk layer in a suitable solvent; if this layer is partially crosslinked, it will not completely dissolve.

Yet another advantage of the foregoing process is the possibility of staging the manufacture of layers in the surfacing film. Constituent layers can be manufactured continuously in successive stages on inexpensive release liners. When the composite clear coat layer is made first, it is possible to optimize extrusion of the bulk layer on an inexpensive release liner, then substitute the release liner with the composite clear coat layer to merge the layers. A similar process can be used to apply the adhesive layer to the bulk layer. This refinement can significantly improve product yield and minimize waste of polyurethane film.

Applications and Properties

The provided surfacing films are useful in paint protection and paint replacement applications. These films can be applied to any of a wide variety of substrates. Such substrates may be flat or curved. When it is desired to adhere these articles to such curved surfaces, it is preferable that the surfacing film has sufficient flexibility to conform to the surface of the substrate without delaminating at the edges or wrinkling.

Common substrates suitable for protection include, for example, bumper facia, pillar posts, rocker panels, wheel covers, headlights, door panels, trunk and hood lids, mirror housings, dashboards, floor mats, and door sills. In an exemplary method of application, a surfacing film can be mounted to a suitable substrate by simultaneously peeling away the release liner from the adhesive layer while applying the film onto the substrate in a single continuous motion.

In some embodiments, the provided surfacing film is applied to the exterior surfaces of automobiles, trucks, motorcycles, trains, airplanes, rotorcraft, marine vehicles, and snowmobiles. In alternative embodiments, the surfacing films can be applied to surfaces of structures other than vehicles, such as fixtures, buildings and architectural surfaces. Applications of these films may be either indoor or outdoor in nature. The provided surfacing films are especially advantageous outdoors not only because of their low surface energy and easy cleaning properties, but because they display excellent weathering, chemical and abrasion resistance while remaining highly flexible.

In some embodiments, the surfacing film has an exposed top surface. Advantageously, the first clear coat layer 104 provides a combination of desirable optical and mechanical properties rendering it especially suitable as an outermost layer in protective film applications.

The optical properties of a clear coat layer or surfacing film can be characterized by its measured light transmission and haze values. It is generally desirable to have the lowest haze possible for clear coat applications. Transmission and haze values for clear coat layer samples can be obtained, for example, using a Haze-Gard Plus instrument available from BYK Gardner USA of Columbia, Md. The cured clear coat layer or surfacing film preferably displays a haze that is less than 6%, less than 5%, less than 4%, less than 3.5%, or less than 3%, as measured according to the Haze Test, as described in U.S. Patent Publication No. 2017/0107398 (Ho et al.). The cured clear coat layer 104 also exhibits a stain-resistant clear coat surface.

Not intended to be exhaustive, particular exemplary embodiments are provided as follows:

1. A surfacing film comprising a plurality of layers, in the following order: a first clear coat layer comprising a crosslinked polyurethane that is a reaction product of: an isocyanate; a polyol selected from the group consisting of: a caprolactone polyol, polycarbonate polyol, a polyester polyol, acrylic polyol, polyether polyol, polyolefin polyol, and mixtures thereof; and a hydroxy-functional silicone poly(meth)acrylate; a second clear coat layer comprising a crosslinked polymer that is essentially free of hydroxy-functional silicone poly(meth)acrylate; a bulk layer comprising a thermoplastic polyurethane; and an adhesive layer.
2. The surfacing film of embodiment 1, wherein the adhesive layer is a pressure-sensitive adhesive layer.
3. The surfacing film of embodiment 1 or 2, wherein the crosslinked polyurethane is an organic solvent-borne polyurethane.
4. The surfacing film of any one of embodiments 1-3, wherein the crosslinked polyurethane is a first crosslinked polyurethane and the crosslinked polymer is a second crosslinked polyurethane.
5. The surfacing film of embodiment 4, wherein the second crosslinked polyurethane is a water-borne polyurethane.
6. The surfacing film of any one of embodiments 1-5, wherein the isocyanate is a primary aliphatic isocyanate.
7. The surfacing film of any one of embodiments 1-6, wherein the adhesive layer is substantially free of any organic solvents.
8. The surfacing film of any one of embodiments 1-7, wherein the bulk layer comprises an aliphatic thermoplastic polyurethane.
9. The surfacing film of any one of embodiments 1-8, wherein the first clear coat layer has a thickness of from 2 micrometers to 25 micrometers.
10. The surfacing film of embodiment 9, wherein the first clear coat layer has a thickness of from 2 micrometers to 20 micrometers.
11. The surfacing film of embodiment 10, wherein the first clear coat layer has a thickness of from 2 micrometers to 15 micrometers.
12. The surfacing film of any one of embodiments 1-11, wherein the second clear coat layer has a thickness of from 2 micrometers to 25 micrometers.

13. The surfacing film of embodiment 12, wherein the second clear coat layer has a thickness of from 2 micrometers to 20 micrometers.
14. The surfacing film of embodiment 13, wherein the second clear coat layer has a thickness of from 2 micrometers to 15 micrometers.
15. The surfacing film of any one of embodiments 1-14, wherein the pressure-sensitive adhesive layer is essentially free of waxes and anti-sticking agents from the thermoplastic polyurethane.
16. The surfacing film of any one of embodiments 1-15, wherein the surfacing film as a whole is essentially free of organic solvent odor.
17. A paint protection film comprising the surfacing film of any one of embodiments 1-16.
18. A paint replacement film comprising the surfacing film of any one of embodiments 1-16.
19. A process of making a surfacing film comprising: disposing a first curable polyurethane clear coat composition on a first release liner, the first curable polyurethane clear coat composition comprising a hydroxy-functional silicone poly(meth)acrylate; only partially curing the first curable polyurethane clear coat composition to provide a first clear coat layer; disposing a second curable polyurethane clear coat composition onto the first clear coat layer; at least partially curing the second curable polyurethane clear coat composition to provide a second clear coat layer on the first clear coat layer, the second curable polyurethane clear coat composition essentially free of a hydroxy-functional silicone poly(meth)acrylate; disposing a thermoplastic polyurethane layer onto the second clear coat layer; and disposing an adhesive layer onto the thermoplastic polyurethane layer.
20. The process of embodiment 19, wherein the only partially cured first curable polyurethane clear coat composition is from 30% to 70% cured.
21. The process of embodiment 20, wherein the only partially cured first curable polyurethane clear coat composition is from 40% to 60% cured.
22. The process of embodiment 21, wherein the only partially cured first curable polyurethane clear coat composition is from 45% to 55% cured.
23. The process of any one of embodiments 19-22, wherein the first curable polyurethane clear coat composition comprises: an isocyanate; a polyol selected from the group consisting of: a caprolactone polyol, polycarbonate polyol, a polyester polyol, acrylic polyol, polyether polyol, polyolefin polyol, and mixtures thereof; and a hydroxy-functional silicone poly(meth)acrylate.
24. The process of embodiment 23, wherein the isocyanate is a primary aliphatic isocyanate.
25. The process of any one of embodiments 19-24, wherein the first curable polyurethane clear coat composition is dispersed in an organic solvent.
26. The process of any one of embodiments 19-25, wherein the second curable polyurethane clear coat composition is dispersed in water.
27. The process of any one of embodiments 19-26, wherein the pressure-sensitive adhesive is substantially free of organic solvent.
28. The process of any one of embodiments 19-27, wherein the pressure-sensitive adhesive is substantially free of waxes and/or anti-sticking agents from the thermoplastic polyurethane layer.
29. The process of any one of embodiments 19-28, wherein only partially curing the first curable polyurethane clear coat composition comprises heating the first curable polyurethane clear coat composition to a temperature of from 25° C. to 150° C.
30. The process of embodiment 29, wherein only partially curing the first curable polyurethane clear coat composition comprises heating the first curable polyurethane clear coat composition to a temperature of from 35° C. to 150° C.
31. The process of embodiment 30, wherein only partially curing the first curable polyurethane clear coat composition comprises heating the first curable polyurethane clear coat composition to a temperature of from 45° C. to 150° C.
32. The process of any one of embodiments 19-31, wherein the second curable polyurethane clear coat composition contains a carboxyl functionality that is reactive with an aziridine curing agent.
33. The process of any one of embodiments 19-32, wherein at least partially curing the second curable polyurethane clear coat composition comprises heating the second curable polyurethane clear coat composition to a temperature of from 25° C. to 150° C.
34. The process of embodiment 33, wherein at least partially curing the second curable polyurethane clear coat composition comprises heating the second curable polyurethane clear coat composition to a temperature of from 35° C. to 150° C.
35. The process of embodiment 34, wherein at least partially curing the second curable polyurethane clear coat composition comprises heating the second curable polyurethane clear coat composition to a temperature of from 45° C. to 150° C.
36. The process of any one of embodiments 19-35, wherein disposing the thermoplastic polyurethane layer onto the second clear coat layer comprises extruding or thermally laminating the thermoplastic polyurethane layer onto the second clear coat layer.
37. The process of embodiment 36, wherein the thermoplastic polyurethane layer is laminated onto the second clear coat layer, and disposing the pressure-sensitive adhesive onto the thermoplastic polyurethane layer occurs prior to disposing the thermoplastic polyurethane layer onto the second clear coat layer.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

TABLE 1

Materials

| Designation | Description | Source |
| --- | --- | --- |
| FOMREZ 55-112 | Hydroxyl terminated saturated linear polyester which is a poly (neopentyl adipate) glycol available under the trade designation "FOMREZ 55-112" | Chemtura (subsidiary of Lanxess), Philadelphia, PA. United States |
| FOMREZ 55-225 | Hydroxyl terminated saturated linear polyester which is a poly (neopentyl adipate) glycol available under the trade designation "FOMREZ 55-225" | Chemtura (subsidiary of Lanxess), Philadelphia, PA. United States |
| CAPA 3031 | Very low molecular weight trifunctional caprolactone polyol available under the trade designation "CAPA 3031" | Perstorp Holding AB, Malmö, Sweden |
| SETALUX 17-1608 | Hydroxy functional acrylic resin available under the trade designation "SETALUX 17-1608" | Allnex, Alpharetta, GA. United States |
| TINUVIN 292 | Liquid hindered amine light stabilizer (HALS) available under the trade designation "TINUVIN 292" | BASF Corporation, Southfield, MI. United States |
| TINUVIN 405 | Solid triazine-based UV absorber available under the trade designation "TINUVIN 405" | BASF Corporation, Southfield, MI. United States |
| PM Acetate | Propylene glycol monomethyl ether acetate slow evaporating solvent available under the designation "PM Acetate" | Eastman Chemicals, Kingsport, TN. United States |
| Butyl Acetate | Ester solvent available under the designation "Butyl Acetate" | Eastman Chemicals, Kingsport, TN. United States |
| Methyl Isobutyl Ketone | Medium evaporating solvent available under the designation "Methyl Isobutyl Ketone (MIBK)" | Eastman Chemicals, Kingsport, TN. United States |
| Xylene | Aromatic hydrocarbon solvent | Azer Scientific, Inc, Morgantown, PA. United States |
| CAB 381-0.1 | Cellulose acetate butyrate ester with medium butyryl content and low viscosity available under the designation "CAB 381-0.1" | Eastman Chemicals, Kingsport, TN. United States |
| TEGO PROTECT-5001 | Silicone polyacrylate polyol resin available under the trade designation "TEGO Protect 5001" | Evonik Industries AG, Essen, Germany |
| DESMODUR N3390 BA/SN | Aliphatic polyisocyanate available under the trade designation "DESMODUR N3390 BA/SN" | Covestro AG, Leverkusen, Germany |
| Acetylacetone | 2,4-Pentanedione available under the designation "Acetylacetone" | Sigma Aldrich, St. Louis, MO. United States |
| DABCO T-12 | Dibutyltin dilaurate DBTDL catalyst available under the trade designation "DABCO T-12" | Evonik Industries AG, Essen, Germany |
| ALBERDINGK 933 | Aliphatic polycarbonate-polyurethane dispersion available under the trade designation "ALBERDINGK U933" | Alberdingk Boley Greensboro, NC. United States |
| TINUVIN 123 | Liquid hindered amine light stabilizer (HALS) available under the trade designation "TINUVIN 123" | BASF Corporation, Southfield, MI. United States |
| AMP-95 | 2-amino-2-methyl-1-propanol containing 5% added water available under the trade designation "AMP-95" | ANGUS Chemical Company, Buffalo Grove, IL. United States |
| TRITON GR-7M | Sulfosuccinate anionic surfactant available under the trade designation "TRITON GR-7M Surfactant" | Dow Chemical Company, Midland, MI. United States |
| Butyl CARBITOL | Hydrophilic glycol ether available under the trade designation "Butyl CARBITOL" | Dow Chemical Company, Midland, MI. United States |
| UVINUL 3039 | Ultraviolet light absorber (UVA) available under the designation "UVINUL 3039" | BASF Corporation, Southfield, MI. United States |
| Water | Deionized water | 3M Company of St. Paul, MN. United States |
| CROSSLINKER CX-100 | Polyfunctional aziridine liquid cross-linker available under the designation "CROSSLINKER CX-100" | DSM Coating Resins LLC, Wilmington, MA. United States |

Test Methods

Staining

The adhesive-side of the sample was adhered to a standard RK8014 clear coated white painted panel available from ACT Test Panels Technologies, Hillsdale, Mich. A 2.54 cm (1 inch) diameter of a staining fluid was placed on the sample and left to age for 24 hours at 23.9° C. (75° F.). After 24 hours, the samples were cleaned with painters' naphtha (VM&P Naphtha, from Ashland Chemical Co., Covington, Ky. United States). Yellowing (Δb) and total color change (ΔE) were measured using a colorimeter. Staining fluids tested were: 10 weight % road tar in diesel and 10weight % bitumen in diesel. An additional test was also conducted by preparing 50 volume % of AC-20 non-emulsified asphalt cement (Marathon Petroleum Company from Findlay, Ohio. United States) in unleaded gasoline. Samples were dipped into the staining fluid for ten seconds and then suspended in a ventilated hood chamber for fifteen minutes to allow the staining fluid to evaporate. The samples were cleaned with painters' naphtha. Yellowing (Δb) and total color change (ΔE) were measured using a colorimeter.

Peel Adhesion Strength

Samples were prepared by slitting uniform test strips 2.54 cm×2.54 cm (1-inch×1-inch) from the sample films. Two replicates of each sample were applied along the length of a standard clear/base coat painted panel measuring 7.1 cm wide by 14.5 cm long by 0.06 cm thick (obtained from ACT Test Panels LLC, Hillsdale, Mich. United States) and rolled down 5 times using a 2.0 kg rubber roller. The plate was cleaned prior to applying the tape by wiping with a solvent (1:3 mixture of isopropyl alcohol and water). After being conditioned for 20 minutes, 24 hours and 168 hours at 50% relative humidity (RH) at ambient temperature (AT) and at 168 hours at −30° C. and then 24 hours at room temperature, the peel adhesion strength was evaluated using a tensile tester (MTS Insight, available from MTS Systems, Corporation, Eden Prairie, Minn.) equipped with 1000 N load cell, using a crosshead speed of 300 mm/min, at an angle of 180 degrees with the test specimen held in the bottom clamp and the tail in the top clamp. The average of two samples was reported in N/decimeter (N/dm). The presence/absence of a solvent odor was also reported as the samples were tested.

Example 1 (EX1)

Step 1: Blending of First Clear Coating Solution

The first clear coat solution was prepared by mixing the ingredients and quantities represented in Table 1 with a 3-blade propeller agitator from Mixer Direct of Louisville, Ky. United States. The mixture of the first clear coat solution was thoroughly agitated for 15 minutes and the solution was coated on a melamine acrylic primed polyester release carrier web with a 27.9 cm (11 inch) wide die coater at a line speed of 7.62 meters per minute (25 feet per minute). The first clear coat was cured in an air oven at 143° C. (290° F.) with a total resident time of 84 seconds. The resulting first clear coat dry thickness was 4.0 microns dry thickness.

TABLE 1

First Clear Coat Composition

| Ingredient | Quantity (grams) |
| --- | --- |
| FOMREZ 55-112 | 4.00 |
| FOMREZ 55-225 | 4.00 |
| CAPA 3031 | 4.00 |
| SETALUX 17-1608 | 15.0 |
| TINUVIN 292 | 0.50 |
| TINUVIN 405 | 1.00 |
| PM Acetate | 13.3 |
| Butyl Acetate | 23.3 |
| Methyl Isobutyl Ketone | 80.5 |
| Xylene | 10.0 |
| CAB 381-0.1 | 2.50 |
| TEGO PROTECT-5001 | 0.50 |
| DESMODUR N3390 BA/SN | 73.0 |
| Acetylacetone | 1.90 |
| DABCO T-12 | 0.05 |

Step 2: Blending of Second Clear Coating Solution

The second clear coat solution was prepared by mixing the ingredients and quantities represented in Table 2 with a 3-blade propeller agitator from Mixer Direct of Louisville, Ky. United States. The mixture of the second clear coat solution was thoroughly agitated for 15 minutes and the solution was coated on the first clear coat at a line speed was at 6.10 meters per minute (20 feet per minute) creating a dual layer clear coat. The dual layer clear coat was then cured in two air ovens one at 107° C. (225° F.) and the other at 143° C. (290° F.) with a total resident time of 108 seconds in each. The second clear coat dry thickness was 6.13 microns dry thickness.

TABLE 2

Second Clear Coat Composition

| Ingredient | Quantity (grams) |
| --- | --- |
| ALBERDINGK 933 | 89.3 |
| TINUVIN 123 | 0.35 |
| AMP-95 | 0.05 |
| TRITON GR-7M | 0.20 |
| Butyl CARBITOL | 8.50 |
| UVINUL 3039 | 1.16 |
| Water | 38.0 |
| CROSSLINKER CX-100 | 1.78 |

Step 3: Laminate to Film

The dual layer clear coat was then thermally laminated to a SPF6 surface protection urethane film (obtained from 3M Company of St. Paul, Minn. United States), which comprised a layer of urethane film, adhesive (isoactyl acetate/acrylic acetate/vinyl acetate), and polyester release liner. The hot can temperature was set at 113° C. (235° F.), nip roll pressure was 40 psi, and line speed was 4.57 meters per meter (15 feet per minute). The polyester release liner on the first clear coat surface was removed after 24 hours. The dual layer clear coat was aged at room temperature for four weeks. Staining and Peel Adhesion Strength Tests were conducted and results are represented in Tables 3, 4, 5, and 6.

Example 2 (EX2)

A first clear coat was identically prepared as described in Example 1. A second clear coating solution was prepared as described in Example 1 except that the line speed was 7.62 meters per minute (25 feet per minute). The second clear coat dry thickness was 5.22 microns. The dual layer clear coat was laminated to the same urethane film as described in Example 1. Staining and Peel Adhesion Strength Tests were conducted and results are represented in Tables 3, 4, 5, and 6.

Example 3 (EX3)

A dual layer clear coat was prepared as described in Example 2 except that the first and second clear coats were laminated to a urethane film SPF6 surface protection urethane film (obtained from 3M Company of St. Paul, Minn. United States), which comprised a layer of urethane film, standard adhesive (isoactyl acetate/acrylic acetate), and paper release liner. The hot lamination conditions were the same as Example 2. Staining and Peel Adhesion Strength Tests were conducted and results are represented in Tables 3, 4, 5, and 6.

Comparative Example 1 (CE1)

A first clear coat was identically prepared as described in Example 1. The clear coat solution was directly coated on a standard urethane film (obtained from 3M Company of St. Paul, Minn. United States), which comprised a layer of 125-micron urethane film, a 35-micron standard adhesive (isoactyl acetate/acrylic acetate/vinyl acetate) layer, and a polyester release liner. The clear coat was coated at 35-micron thickness and was cured for 80 seconds at 140° C. in an air oven. The coating line speed was at 4.57 meters per minute (15 feet per minute). The partially cured clear coat was laminated to a polyester cover sheet using the same conditions as described in Example 1. The clear coat was cured at ambient temperature for two weeks. The thickness of the final cured clear coat was 8 microns. Peel Adhesion Strength Testing was conducted and results are represented in Table 6.

Comparative Example 2 (CE2)

Staining and Peel Adhesion Strength Tests were conducted on ULTIMATE PLUS Film (obtained from XPEL, Inc of San Antonio, Tex. United States) and results are represented in Tables 3, 4, 5, and 6.

Comparative Example 3 (CE3)

Staining and Peel Adhesion Strength Tests were conducted on Extreme Film (obtained from XPEL, Inc of San Antonio, Tex. United States) and results are represented in Tables 3, 4, 5, and 6.

Comparative Example 4 (CE4)

Staining and Peel Adhesion Strength Tests were conducted on PPF Clear Film (obtained from SUNTEK a subsidiary of Eastman Performance Films of Martinsville, Va. United States) and results are represented in Tables 3, 4, 5, and 6.

Comparative Example 5 (CE5)

Peel Adhesion Strength testing was conducted on PPF Ultra Film (obtained from SUNTEK a subsidiary of Eastman Performance Films of Martinsville, Va. United States) and results are represented in Table 6.

Comparative Example 6 (CE6)

Staining Tests were conducted on XP CLEARSHIELD Pro Film (obtained from Solar Gard of San Diego, Calif. United States) and results are represented in Tables 3, 4, and 5.

TABLE 3

| Staining Test Results - 10 wt. % Road Tar in Diesel | | | | | | | |
|---|---|---|---|---|---|---|---|
| | EX1 | EX2 | EX3 | CE2 | CE3 | CE4 | CE6 |
| $\Delta b$ | 0.80 | 0.98 | 1.13 | 1.69 | 5.61 | 1.48 | 2.57 |
| $\Delta E$ | 0.89 | 1.10 | 1.10 | 1.69 | 5.61 | 1.53 | 2.90 |

TABLE 4

| Staining Test Results - 10 wt. % Bitumen in Diesel | | | | | | | |
|---|---|---|---|---|---|---|---|
| | EX1 | EX2 | EX3 | CE2 | CE3 | CE4 | CE6 |
| $\Delta b$ | 0.50 | 0.65 | 0.75 | 1.47 | 3.94 | 1.43 | 4.08 |
| $\Delta E$ | 0.56 | 0.76 | 0.89 | 1.54 | 4.11 | 1.46 | 4.28 |

TABLE 5

| Staining Test Results - 50 volume % AC-20 Asphalt Cement in Unleaded Gasoline | | | | | | | |
|---|---|---|---|---|---|---|---|
| | EX1 | EX2 | EX3 | CE2 | CE3 | CE4 | CE6 |
| $\Delta b$ | 0.93 | 0.91 | 0.91 | 1.13 | 4.60 | 2.54 | 1.78 |
| $\Delta E$ | 1.05 | 1.03 | 1.02 | 1.24 | 5.10 | 2.75 | 2.07 |

TABLE 6

| Peel Adhesion Strength Test Results (N/m) | | | | | | | | |
|---|---|---|---|---|---|---|---|---|
| | EX1 | EX2 | EX3 | CE1 | CE2 | CE3 | CE4 | CE5 |
| 20 min @ AT | 886.68 | 811.51 | 1232.96 | 533.65 | 478.81 | 459.71 | 431.23 | 537.09 |
| 24 hours @ AT | 1079.81 | 1060.38 | 1475.50 | 861.62 | 652.03 | 630.70 | 652.66 | 604.90 |
| 168 hours @ AT | 1058.12 | 1055.21 | 1413.62 | 831.94 | 794.43 | 752.77 | 681.97 | 642.90 |

TABLE 6-continued

Peel Adhesion Strength Test Results (N/m)

|  | EX1 | EX2 | EX3 | CE1 | CE2 | CE3 | CE4 | CE5 |
|---|---|---|---|---|---|---|---|---|
| 168 hours @−30° C. | 1015.55 | 1010.32 | 1370.74 | 695.10 | 706.23 | 697.54 | 691.70 | 574.50 |
| Solvent Odor | Absent | Absent | Absent | Present | Present | Present | Present | Present |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A surfacing film comprising a plurality of layers, in the following order:
   a first clear coat layer comprising a crosslinked polyurethane that is a reaction product of:
      an isocyanate;
      a polyol selected from the group consisting of: a caprolactone polyol, polycarbonate polyol, a polyester polyol, acrylic polyol, polyether polyol, polyolefin polyol, and mixtures thereof; and
      a hydroxy-functional silicone poly(meth)acrylate;
   a second clear coat layer comprising a crosslinked polymer that is essentially free of hydroxy-functional silicone poly(meth)acrylate;
   a bulk layer comprising a thermoplastic polyurethane; and
   an adhesive layer.

2. The surfacing film of claim 1, wherein the crosslinked polyurethane is an organic solvent-borne polyurethane.

3. The surfacing film of claim 1, wherein the crosslinked polyurethane is a first crosslinked polyurethane and the crosslinked polymer is a second crosslinked polyurethane.

4. The surfacing film of claim 3, wherein the second crosslinked polyurethane is a water-borne polyurethane.

5. The surfacing film of claim 1, wherein the isocyanate is a primary aliphatic isocyanate.

6. The surfacing film of claim 1, wherein the adhesive layer is essentially free of any organic solvents.

7. The surfacing film of claim 1, wherein the bulk layer comprises an aliphatic thermoplastic polyurethane.

8. The surfacing film of claim 1, wherein the surfacing film as a whole is essentially free of organic solvent odor.

9. A process of making a surfacing film comprising:
   disposing a first curable polyurethane clear coat composition on a first release liner, the first curable polyurethane clear coat composition comprising a hydroxy-functional silicone poly(meth)acrylate;
   only partially curing the first curable polyurethane clear coat composition to provide a first clear coat layer;
   disposing a second curable polyurethane clear coat composition onto the first clear coat layer;
   at least partially curing the second curable polyurethane clear coat composition to provide a second clear coat layer on the first clear coat layer, the second curable polyurethane clear coat composition essentially free of a hydroxy-functional silicone poly(meth)acrylate;
   disposing a thermoplastic polyurethane layer onto the second clear coat layer; and
   disposing an adhesive layer onto the thermoplastic polyurethane layer.

10. The process of claim 9, wherein the only partially cured first curable polyurethane clear coat composition is from 30% to 70% cured.

11. The process of claim 9, wherein the first curable polyurethane clear coat composition comprises:
   an isocyanate;
   a polyol selected from the group consisting of: a caprolactone polyol, polycarbonate polyol, a polyester polyol, acrylic polyol, polyether polyol, polyolefin polyol, and mixtures thereof; and
   a hydroxy-functional silicone poly(meth)acrylate.

12. The process of claim 9, wherein disposing the thermoplastic polyurethane layer onto the second clear coat layer comprises extruding or thermally laminating the thermoplastic polyurethane layer onto the second clear coat layer.

13. The process of claim 12, wherein the thermoplastic polyurethane layer is laminated onto the second clear coat layer, and disposing the pressure-sensitive adhesive onto the thermoplastic polyurethane layer occurs prior to disposing the thermoplastic polyurethane layer onto the second clear coat layer.

14. The process of claim 9, wherein disposing the pressure-sensitive adhesive onto the thermoplastic polyurethane layer comprises extruding or thermally laminating the pressure-sensitive adhesive onto the thermoplastic polyurethane layer.

15. The process of claim 14, wherein the pressure-sensitive adhesive is thermally laminated onto the thermoplastic polyurethane layer, and the pressure-sensitive adhesive is disposed onto a release liner prior to thermally laminating the pressure-sensitive adhesive onto the thermoplastic polyurethane layer.

* * * * *